US012607710B2

(12) United States Patent
Falk

(10) Patent No.: US 12,607,710 B2
(45) Date of Patent: Apr. 21, 2026

(54) MULTIPLE-INPUT MULTIPLE-OUTPUT RADAR SYSTEM

(71) Applicant: SAAB AB, Linköping (SE)

(72) Inventor: Kent Falk, Gothenburg (SE)

(73) Assignee: SAAB AB, Linköping (SE)

( * ) Notice: Subject to any disclaimer, the term of this patent is extended or adjusted under 35 U.S.C. 154(b) by 300 days.

(21) Appl. No.: 18/254,416

(22) PCT Filed: Nov. 22, 2021

(86) PCT No.: PCT/SE2021/051159
§ 371 (c)(1),
(2) Date: May 25, 2023

(87) PCT Pub. No.: WO2022/115018
PCT Pub. Date: Jun. 2, 2022

(65) Prior Publication Data
US 2024/0045023 A1 Feb. 8, 2024

(30) Foreign Application Priority Data

Nov. 26, 2020 (SE) .................................... 2000221-8

(51) Int. Cl.
*G01S 13/931* (2020.01)
*G01S 7/02* (2006.01)
*G01S 7/03* (2006.01)

(52) U.S. Cl.
CPC ............ *G01S 7/032* (2013.01); *G01S 7/0235* (2021.05); *G01S 13/931* (2013.01)

(58) Field of Classification Search
CPC ...... G01S 7/032; G01S 7/0235; G01S 13/931; G01S 7/03; G01S 13/42; G01S 7/023;
(Continued)

(56) References Cited

U.S. PATENT DOCUMENTS

| 2008/0100510 A1 | 5/2008 | Bonthron et al. | |
| 2010/0328157 A1* | 12/2010 | Culkin ................. | H01Q 21/061 342/372 |

(Continued)

FOREIGN PATENT DOCUMENTS

| CN | 105467365 A | 4/2016 |
| CN | 106291541 A | 1/2017 |

(Continued)

OTHER PUBLICATIONS

G. Shulkind, G. W. Wornell and Y. Kochman, "Direction of arrival estimation in MIMO radar systems with nonlinear reflectors," 2016 IEEE International Conference on Acoustics, Speech and Signal Processing (ICASSP), Shanghai, China, 2016, pp. 3016-3020 (Year: 2016).*

(Continued)

*Primary Examiner* — Robert W Hodge
*Assistant Examiner* — Bongani Jabulani Mashele
(74) *Attorney, Agent, or Firm* — Sage Patent Group

(57) ABSTRACT

The present disclosure relates to a multiple-input multiple-output (MIMO) radar system comprising an antenna comprising at least two sparse transmit arrays, each sparse transmit array comprising a plurality of antenna elements. The antenna elements of each sparse transmit arrays are at least partially overlapping with the antenna elements of the other sparse transmit arrays of the at least two sparse transmit arrays. Further, there is control circuitry connected to the antenna. The control circuitry is configured to transmit a signal having a waveform by means of each sparse transmit array, wherein the waveform of each signal is substantially orthogonal relative to a waveform of each other signal of each other sparse transmit arrays of the at least two sparse transmit arrays.

12 Claims, 12 Drawing Sheets

(58) Field of Classification Search
CPC .......... G01S 7/0232; G01S 7/35; G01S 7/352;
G01S 7/356
See application file for complete search history.

(56) References Cited

U.S. PATENT DOCUMENTS

| | | | |
|---|---|---|---|
| 2017/0139042 A1 | 5/2017 | Alenljung et al. | |
| 2018/0156891 A1 | 6/2018 | Brune et al. | |
| 2019/0285738 A1 * | 9/2019 | Iwasa ...................... | G01S 7/285 |
| 2020/0103495 A1 | 4/2020 | Iwasa et al. | |

FOREIGN PATENT DOCUMENTS

| | | | | |
|---|---|---|---|---|
| CN | 108089159 A | 5/2018 | | |
| EP | 3471210 A1 | 4/2019 | | |
| EP | 3543738 A1 | 9/2019 | | |
| WO | 2014/133488 A2 | 9/2014 | | |
| WO | WO-2019195327 A1 * | 10/2019 | ............. | G01S 13/34 |
| WO | 2019/215734 A1 | 11/2019 | | |
| WO | WO-2020100464 A1 * | 5/2020 | ............. | H01Q 1/246 |

OTHER PUBLICATIONS

"Proceedings"; 2012 IEEE International Conference on Signal Processing, Communications and Computing (ICSPCC); The Poly- technic University of Hong Kong; Aug. 12-15, 2012; Paper Title : Phased-MIMO Radar With Frequency Diversity for Increased System Flexibility; 53 pages.
Ni, Dong et al.; "A Study on the Application of Subarrayed Time-Modulated Arrays to MIMO Radar," IEEE Antennas and Wireless Propagation Letters, vol. 16, 2017; pp. 1171-1174 (4 pages).
International Search Report and Written Opinion mailed Jan. 27, 2022 for International Application No. PCT/SE2021/051159, 15 pages.
Office Action mailed Jun. 22, 2021 for Swedish Patent Application No. 2000221-8, 10 pages.
Office Action mailed Jan. 27, 2022 for Swedish Patent Application No. 2000221-8, 5 pages.
International Preliminary Report on Patentability (IPRP) mailed Mar. 15, 2023 for International Application No. PCT/SE2021/ 051159, 10 pages.
Extended European Search Report mailed Oct. 1, 2024 for European Patent Application No. 21898802.0, 8 pages.
Shulkind, Gal et al.; "Direction of Arrival Estimation in MIMO Radar Systems with Nonlinear Reflectors"; 2016 IEEE International Conference on Acoustics, Speech and Signal Processing (ICASSP); Mar. 20, 2016; XP032901157; 5 pages.
Mao, Linlin et al.; "Transmit Subaperturing for MIMO Radars with Nested Arrays"; Signal Processing, vol. 134; Dec. 18, 2016; XP029889426; 5 pages.

* cited by examiner

MULTIPLE-INPUT MULTIPLE-OUTPUT RADAR SYSTEM

CROSS-REFERENCE TO RELATED APPLICATIONS

This application is a 35 U.S.C § 371 national stage application for International Application No. PCT/SE2021/051159, entitled "A MULTIPLE-INPUT MULTIPLE-OUTPUT RADAR SYSTEM", filed on Nov. 22, 2021, which claims priority to Swedish Patent Application No. 2000221-8, filed on Nov. 26, 2020, the disclosures and contents of which are hereby incorporated by reference in their entireties.

TECHNICAL FIELD

The present disclosure relates to a multiple-input multiple-output (MIMO) radar system.

BACKGROUND ART

Radar systems are known in the art and are used to detect the range and velocity of nearby targets in an environment and are applied in several applications such as within the automotive field or for telecommunication purposes.

The ability of a radar system to distinguish between two closely spaced targets is conventionally referred to as the resolution of a radar system. Angular resolution is the ability of the radar system to distinguish between two targets at the same range and closely separated in azimuth or elevation. Angular resolution is directly related to radar antenna beamwidth.

To achieve a specific angular resolution, Ae, existing solutions requires an antenna size, L, exceeding the ratio between the used wavelength, $\lambda$, and the desired angular resolution, $\Delta\theta$, measured in radians. This relation can be formulated as: $L>\lambda/\Delta\theta$. A problem with this approach is that it may lead to an unacceptable antenna size.

Another way to realize a radar system is to utilize a multiple-input multiple output (MIMO) antenna where multiple transmit and receive antennas transmit and receive radar signals. A MIMO radar system may beneficially be used to minimize antenna length compared to a conventional antenna. However, a major part of the transmit side-lobe suppression may be lost in many MIMO radar configurations.

Thus, angular side-lobe suppression may only be present in the receive direction of the MIMO radar system, making it difficult to compete with a conventional antenna with side-lobe suppression in both directions.

Thus, there is a need for an antenna configuration that allows for the combination of having a small antenna, high angular resolution, a good side-lobe suppression and a short reaction time. Accordingly, there is room for a radar system in the present art to explore the domain of providing an improved radar system with a small antenna size, high angular resolution and side-lobe suppression.

Even though some currently known solutions work well in some situations it would be desirable to provide a radar system that fulfils the abovementioned requirements.

SUMMARY

It is therefore an object of the present disclosure to provide a MIMO radar system, a fixed installation and a vehicle comprising such a radar system to mitigate, alleviate or eliminate one or more of the above-identified deficiencies and disadvantages.

This object is achieved by means of a radar system, a fixed installation and a vehicle as defined in the appended claims.

The present disclosure provides a multiple-input multiple-output, MIMO radar system comprising an antenna comprising at least two sparse transmit arrays, each sparse transmit array comprising a plurality of antenna elements. The antenna elements of each sparse transmit arrays are at least partially overlapping with the antenna elements of the other sparse transmit arrays of the at least two sparse transmit arrays. Further, control circuitry is connected to the antenna, the control circuitry is configured to transmit a signal having a waveform by means of the each sparse transmit array. The waveform of each signal is substantially orthogonal relative to a waveform of each other signal of each other sparse transmit arrays of the at least two sparse transmit arrays. Furthermore, the waveforms of each signal together form an interference pattern, and wherein a sum of all interference patterns of all of the signals illuminate an area of interest.

A benefit of the system is that is allows for a constant illumination of the area of interest. Further, the system allows for having a small antenna but still providing a high angular resolution, side-lobe suppression and a short reaction time. The term substantially, with respect to the orthogonality between different waveforms should be understood as that the waveforms are essentially orthogonal.

The radar system may further comprise at least one receive array. The receive array allows the radar system to receive radar echoes.

The control circuitry may further be configured to control an excitation amplitude of each antenna element of the receive array such that a receive main-beam width is matched to a separation between adjacent transmit interference peaks. The control circuitry may be configured to apply a 40 dB Taylor taper configuration. This allows for an improved side-lobe suppression.

However, in some embodiments, the receive array may be a uniform linear receive array.

Each sparse transmit array may be linearly arranged with a combined length equal to a length of the receive array multiplied by an aperture efficiency of the receive array. By arranging the transmit antenna such that the combined length of the sparse transmit arrays is equal to a length of the receive array the system provides the benefit of further improving the side-lobe suppression of the system.

Each of the sparse transmit arrays may comprise a central portion at an intermediate location between two end portions along at least a first linear row, and wherein the antenna elements of at least one sparse transmit array of the at least two sparse transmit arrays are arranged in a space tapered configuration having a higher density of a number of antenna elements in the central portion relative to the end portions. In other words, space tapering may be introduced in the transmit arrays of the system. Allowing for a lower weight of the system while also providing for a further improved side-lobe suppression. It should be noted that the transmit arrays may have a plurality of portions on each side of the central portion and respective end portions with different space tapering configurations.

Each signal may be associated with angular ambiguities, wherein the control circuitry is further configured to control a phase-front of each waveform to distribute the angular ambiguities over the area of interest. This provides the benefit of allowing for a constant or "even" illumination of an area of interest to be achieved.

The orthogonality between the waveforms may be obtained by at least one of carrier separation, time division, and coding of the intrapulse modulation.

In some embodiments, at least two adjacent antenna elements of each sparse transmit array have a spacing between each other of at least half a wavelength of an operating frequency of the radar system. In more detail, if the radar system has an operating frequency band, the spacing between adjacent elements of each sparse transmit array may be at least half a wavelength of the lowest frequency within the operating frequency band.

The antenna elements of each sparse transmit arrays may be at least partially overlapping with the antenna elements of the other sparse transmit arrays such that a first antenna element of a first sparse transmit array is adjacent to a first antenna element of the second sparse transmit array.

A benefit of having overlapping transmit arrays is that it allows for efficient phase steering the respective beams so to provide for constant illumination of an area of interest.

There is further provided a fixed installation comprising the radar system as disclosed herein. The fixed installation may be a ground based radar.

There is further provided a vehicle, comprising the radar system as disclosed herein. The vehicle may be an airborne vehicle, a ship, or a ground vehicle.

It is to be understood that the herein disclosed disclosure is not limited to the particular component parts described or steps described since such system may vary. It is also to be understood that the terminology used herein is for purpose of describing particular embodiments only, and is not intended to be limiting.

BRIEF DESCRIPTION OF THE DRAWINGS

In the following the disclosure will be described in a non-limiting way and in more detail with reference to exemplary embodiments and tests illustrated in the enclosed drawings, in which.

DETAILED DESCRIPTION

Figure 1:
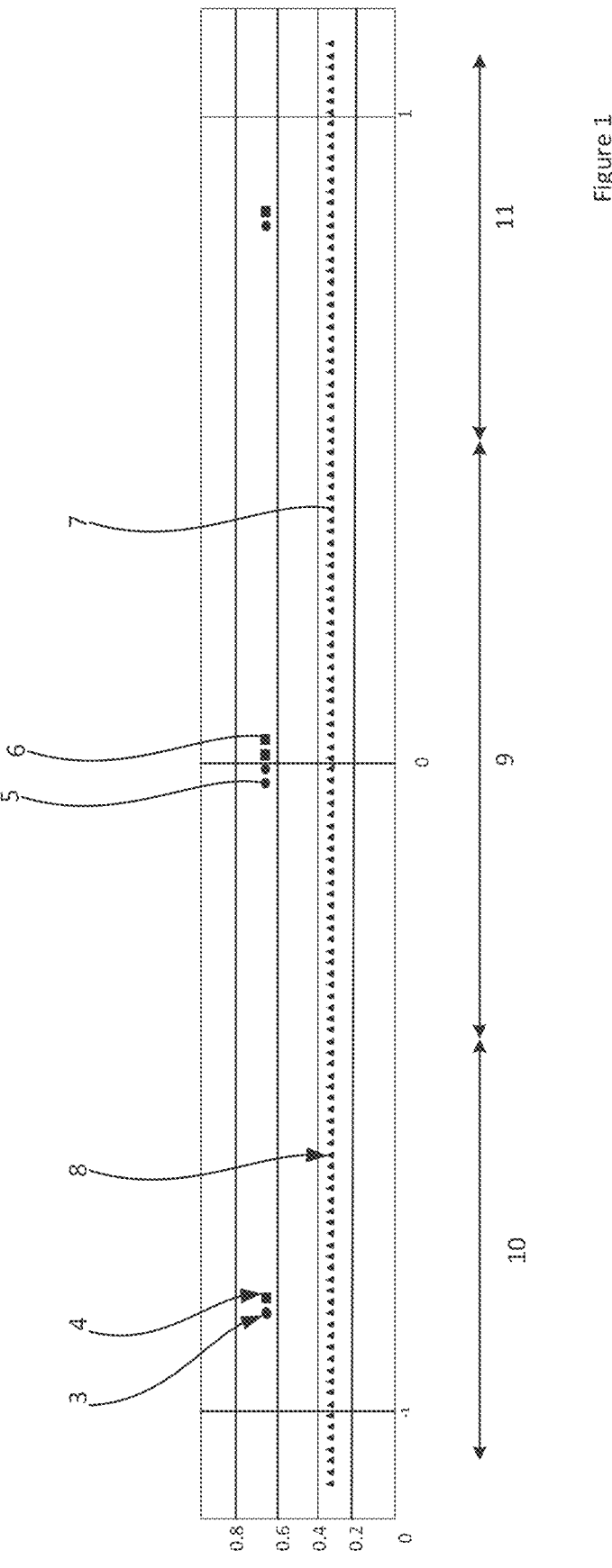
FIG. 1 illustrates overlapping sparse transmit arrays and a receive array in accordance with an embodiment of the present disclosure.

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided system, it will be apparent to one skilled in the art that the system may be realized without these details. In other instances, well known constructions or functions are not described in detail, so as not to obscure the present disclosure.

In the following description of example embodiments, the same reference numerals denote the same or similar components.

The term "radar" refers to a system operating by transmitting a signal reflecting on the environment and comparing the transmitted signal and the received signal such to e.g. estimate a range, velocity and/or an angle of an object. The radar may transmit signals as a continuous signal or as pulses.

The term "sparse antenna" refers to an antenna having elements having a relatively large element spacing between at least two adjacent elements in an array.

The term "side-lobe suppression" refers to the suppression of signal leakage from the antenna. Side-lobe signals cause interference on the channel and should preferably be supressed. The side-lobes are the lobes of the radiation pattern that are not the main lobe i.e. coming from the direction outside the main-lobe.

The term "MIMO radar" refers to a radar having multiple transmitting and receiving antennas.

FIG. 1 shows two overlapping transmit arrays 3, 4 with a sum of 8 antenna elements. The first transmit array 3 is denoted with circles representing the antenna elements 5 of the first transmit array. The second transmit array 4 is denoted with squares representing the antenna elements 6 of the second transmit array. Further, FIG. 1 shows a receive array 8 with 128 antenna elements 7 denoted as triangles in FIG. 1. FIG. 1 illustrates two sparse transmit arrays 3, 4 combined with a receive array 8 in accordance with an embodiment of the present disclosure. In other words, FIG. 1 shows, a multiple-input multiple-output, MIMO radar system 1 comprising an antenna 2 (see e.g. FIG. 2) comprising at least two sparse transmit arrays 3, 4, each sparse transmit array 3, 4 comprising a plurality of antenna elements 5, 6. The antenna elements 5, 6 of each sparse transmit arrays 3, 4 are at least partially overlapping with the antenna elements 5, 6 of the other sparse transmit arrays 3, 4 of the at least two sparse transmit arrays 3, 4.

Figure 2:
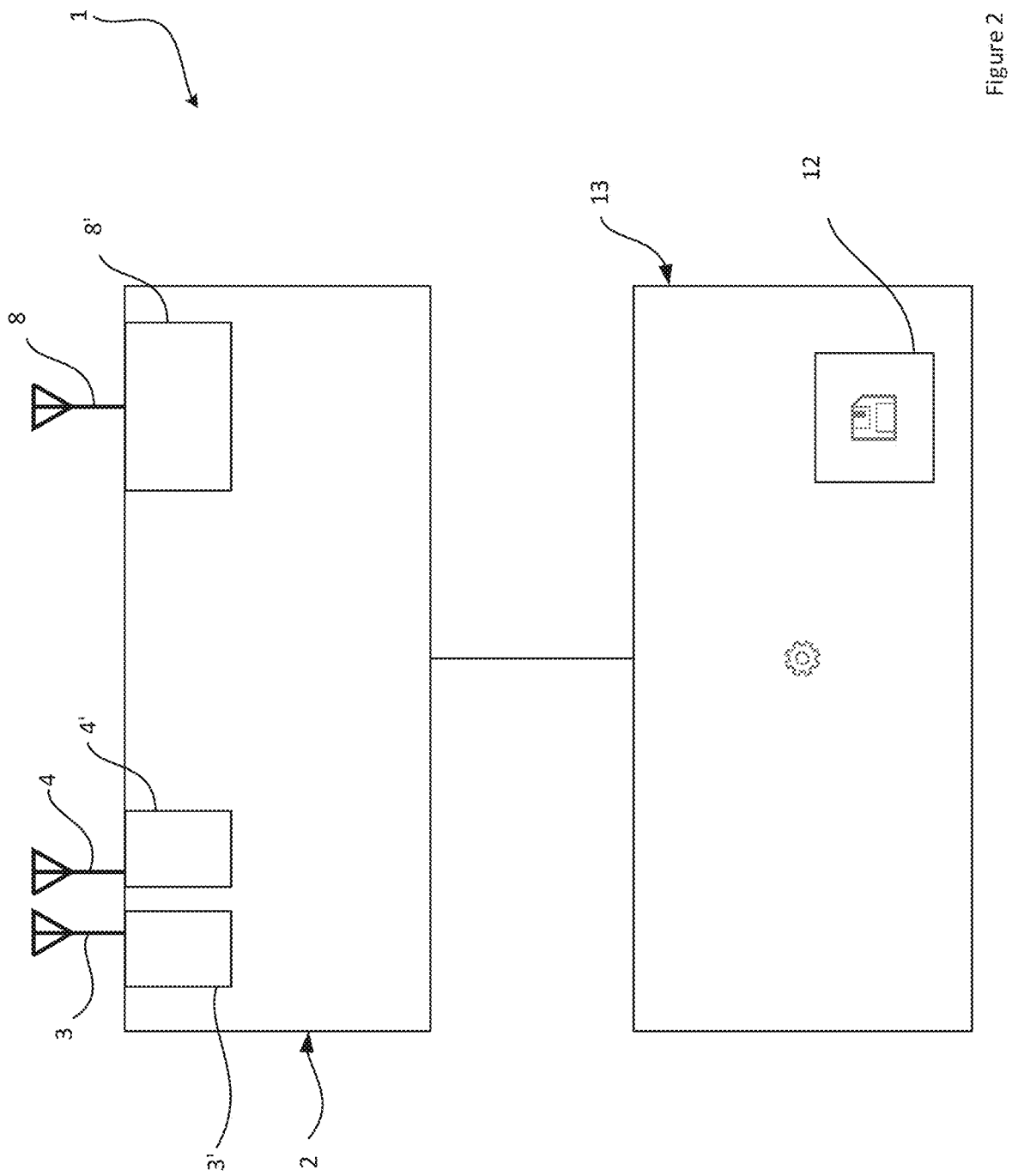
FIG. 2 illustrates a system in accordance with an embodiment of the present disclosure

Further, there is control circuitry 13 connected to the antenna (not shown in FIG. 1, see FIG. 2). The control circuitry 13 is configured to transmit a signal having a waveform by means of each sparse transmit array 3, 4, wherein the waveform of each signal is substantially orthogonal relative to a waveform of each other signal of each other sparse transmit arrays 3, 4 of the at least two sparse transmit arrays 3, 4. The waveforms of each signal together form an interference pattern, wherein a sum of all interference patterns of all of the signals illuminate an area of interest.

An "area of interest" may be understood as the general direction that the transmitted signal is directed towards. Thus, if the antenna is directed towards a specific object in the surrounding environment of the antenna, then that specific target and the surrounding area is "an area of interest".

Figure 3:
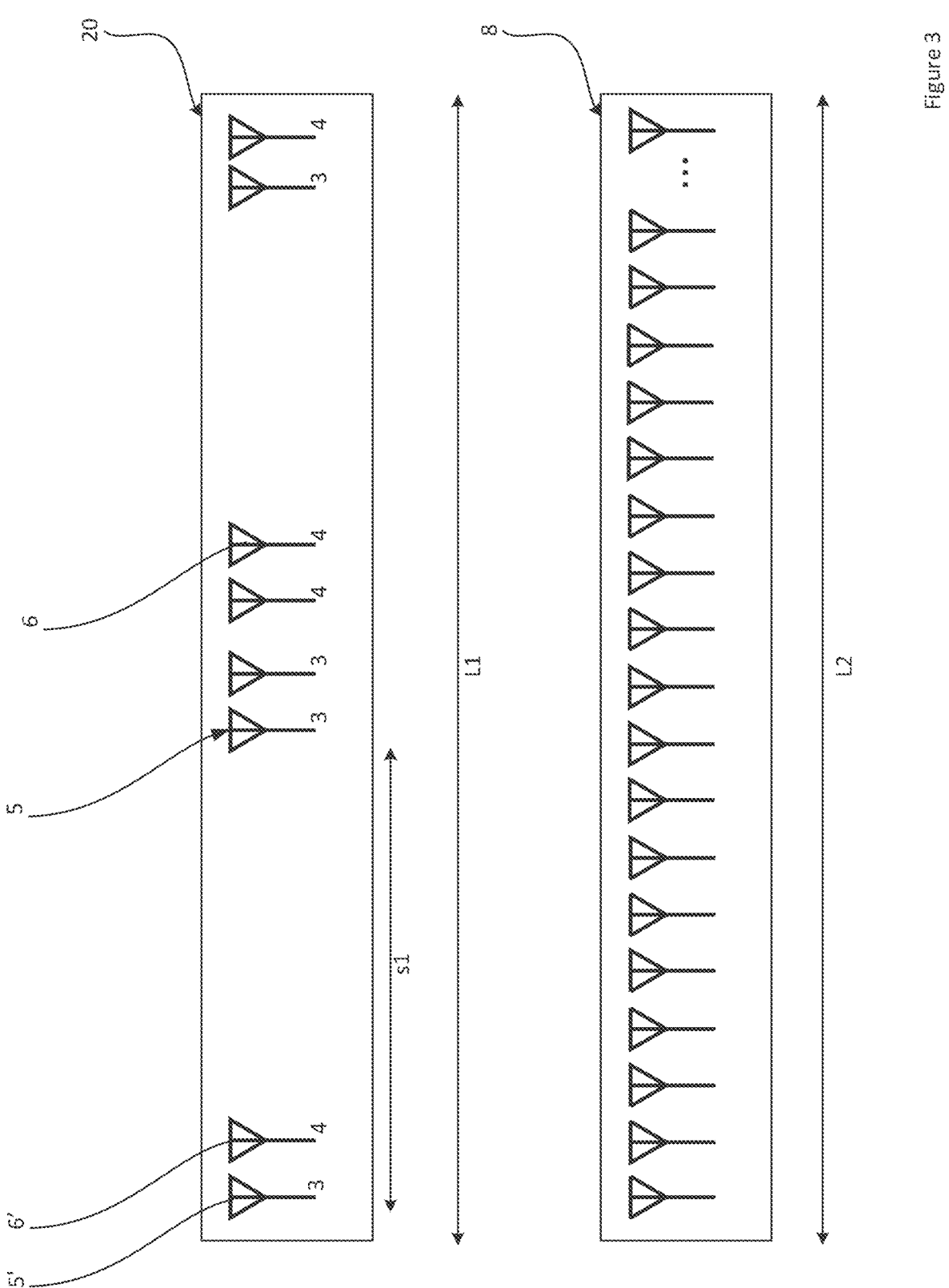
FIG. 3 illustrates an overlapping sparse transmit arrays and a receive array in accordance with an embodiment of the present disclosure FIG. 4 Illustrates a diagram showing separate carriers used in each of the two transmit arrays illustrated in FIGS. 1-3.

As shown in FIG. 1 the first and the second transmit arrays 3, 4 are overlapping, such that one or more antenna elements 5 of the first transmit array are in between two adjacent antenna elements 6 of the second transmit array. In other words, the antenna elements 5 of each sparse transmit arrays 3, 4 are at least partially overlapping with the antenna elements 5 of the other sparse transmit arrays such that a first antenna element 5' of a first sparse transmit array 3 is adjacent to a first antenna element 6' of the second sparse transmit 4 array (as shown in FIG. 3).

Thus, the term "overlapping" may in the present context be understood as that the antenna elements of the two or more sparse transmit arrays 3, 4 are spatially overlapping. In other words, the antenna elements of each sparse transmit arrays are at least partially interleaved with the antenna elements of the other sparse transmit arrays. In some embodiments, the antenna elements of each sparse transmit arrays are (fully) interleaved with the antenna elements of the other sparse transmit arrays.

Stated differently, at least one antenna element of the two or more sparse transmit arrays 3, 4 are arranged such that one or more antenna elements of each sparse transmit array is arranged between two antenna elements of the one or more of the other sparse transmit arrays. Accordingly, if the antenna elements of one sparse transmit array define a line between the "edge elements" of the array then the antenna elements of the other sparse transmit arrays are at least partly distributed on the same line.

For example, if the sparse transmit arrays 3, 4 are linear array arranged along a straight line, where each sparse transmit array 3, 4 comprises two or more central antenna elements and one peripheral antenna element on each end/ edge, Then, the two sparse transmit arrays 3, 4 are arranged such that the combined transmit array has an antenna element of the first transmit array 3 that defines the most peripheral antenna element of the combined array on a first edge of the combined transmit array while an antenna element of the second transmit array 4 defines the most peripheral antenna element of the combined array on a second edge of the combined transmit array, where the first edge is opposite to the second edge. This example setup is illustrated in FIG. 3.

As further shown in FIG. 1 each of the sparse transmit arrays 3, 4 comprise a central portion 9 at an intermediate location between two end portions 10, 11 along at least a first linear row, and wherein the antenna elements 5 of at least one sparse transmit array 3, 4 of the at least two sparse transmit arrays 3, 4 are arranged in a space tapered configuration having a higher density of a number of antenna elements 5 in the central portion 9 relative to the end portions 10, 11. In FIG. 1, each transmit array 3, 4 have two antenna elements 5, 6 in a central portion 9 and one antenna element 5, 6 each at the end portions 10, 11 i.e. a higher density of antenna elements 5, 6 in the central portion 3, 4. The term "space tapering" may be interchanged with the term "density tapering".

The orthogonality between the waveforms is obtained by means of at least one of suitable carrier separation, time division, and coding of the intrapulse modulation of each transmit array 3, 4.

FIG. 2 shows the system 1 in accordance with an embodiment of the present disclosure. The system 1 comprises an antenna having two sets of transmitters 3', 4' (i.e. TX modules) and one set of receivers 8' (i.e. RX modules). Further, the system 1 comprises control circuitry 13 configured to control the operation of/operate the transmitters 3', 4' and the receivers 8'. The system 1 in FIG. 2 may be a monostatic radar, thus having the transmitters 3', 4' and the receivers 8' collocated in the system allowing for an improved synchronization of the transmitters 3', 4' and receivers 8'. Each transmitter/receiver 3', 4', 8' in is suitably connected to a corresponding antenna element 5, 6, 7 of each transmit array 3, 4 and the receive array 8, respectively.

The radar system 1 may be connected to a network via an Ethernet connection or other types of network connections. The radar system 1 may have memory device 12 to store software used for processing the signals in order to determine range, velocity and location of objects. A memory device 12 may also be used to store information about targets and clutter in the environment.

As further seen in FIG. 2, the control circuitry may comprise one or more memory devices 12. The memory device 12 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 13. Each memory device 12 may store any suitable instructions, data or information, including a computer program, software, an application including one or more of logic, rules, code, tables, etc. and/or other instructions capable of being executed by the control circuitry 13 and, utilized. Memory device 12 may be used to store any calculations made by control circuitry 13 and/or any data received via interface. In some embodiments, each control circuitry 13 and each memory device 12 may be considered to be integrated.

Each memory device 12 may also store data that can be retrieved, manipulated, created, or stored by the control circuitry 13.

The control circuitry 13 may include, for example, one or more central processing units (CPUs), graphics processing units (GPUs) dedicated to performing calculations, and/or other processing devices. The memory device 12 can include one or more computer-readable media and can store information accessible by the control circuitry 13 including instructions/programs that can be executed by the control circuitry.

The instructions which may be executed by the control circuitry 13 may comprise instructions for signal operation or analysis according to any aspects of the present disclosure. For example, the control circuitry 13 may be configured to perform any step as disclosed in the present disclosure such as transmitting signals from the transmitters 3', 4' and receiving signals at the receivers 8'.

The radar system 2 may be coupled to a network which may be any type of communication network, such as a local area network (e.g. intranet), wide area network (e.g. Internet), cellular network, or some combination thereof.

The radar system 2 may comprise other conventional modules and components such as signal generators (e.g. at least one signal generator for each transmit array 3, 4 or one for each transmit element 5, 6) generating a plurality of baseband signals, feeding modules, analogue-to-digital converters, ADC, amplifiers (e.g. one ADC and amplifier for each antenna element 7 of the receive array 8), digital-to-analogue converters and other necessary means for performing the method in accordance with the present disclosure, The control circuitry 13 may further be configured to control excitation phase and amplitude of each antenna element 7 of the receive array 8 such that all receive main-beam widths are matched to corresponding separation between adjacent transmit interference peaks. In other words, the excitation phases and amplitudes of each element 7 in the receive array 8 is changed in a manner from a central portion of an array to an end portion of an array (see FIG. 1 for central and end portion). Accordingly, the system 1 may obtain side-lobe suppression by beam weighting individual antenna elements.

In more detail, in some embodiments, weighted sums of the signals from the antenna elements 7 of the receive array 8 is formed. Here, each signal and each antenna element 7 has a weighting coefficient (having a phase and amplitude) applied thereto, where the weighting coefficients are adapted for each respective lobe direction, in order to simultaneously form "receive lobes" that are distributed across the illuminated area of interest.

The receive array 8 in FIGS. 1 and 2 may be a uniform linear receive array. Thus, having antenna elements 5 distributed along a common row with uniform spacing as seen in FIG. 1.

Furthermore, each signal may be associated with angular ambiguities, wherein the control circuitry 13 may be further configured to control a phase-front of each waveform to distribute the angular ambiguities over the area of interest.

FIG. 3 illustrates FIG. 1 from a schematic perspective with a receive array 8 and a transmit array 20 comprising two sparse transmit arrays 3, 4 each antenna element 5, 6 is furthermore denoted based on the transmit array 3, 4 it belongs to. Each sparse transmit array 3, 4 is linearly arranged with a combined length L1 that in some embodiments could be equal to a length L2 of the receive array 8 multiplied by an aperture efficiency of the receive array 8. The aperture efficiency may be defined as the ratio of the effective radiating area (or effective area) to the physical area of the aperture. For a linear array, the aperture is the ratio of the effective radiating length to the physical length of the linear array antenna. The aperture efficiency is preferably in a range of 75-95%.

As further seen in FIG. 3, at least two adjacent antenna elements 5 of each sparse transmit array 3, 4 have a spacing s1 between each other, the spacing s1 may be of at least half a wavelength of an operating frequency of the radar system 1. The radar system 1 may have an operating frequency or have an operating frequency band within the range of 5 Mhz to 30 GHz.

For further describing the disclosure as presented herein accompanied with further advantages thereof, a simulation of the system 1 in accordance with an embodiment as disclosed in FIGS. 1-3 will be described herein. The test result is presented in the FIGS. 4-8. It should be noted that the test is based on an embodiment for a disclosing purpose, however it is not limited to said embodiment and may be varied within the present disclosure. E.g. the number of transmitters, antenna elements of each transmitter, receivers, antenna elements of the receiver, space tapering configuration and any other configuration may be varied in accordance with the present disclosure.

Figure 4:
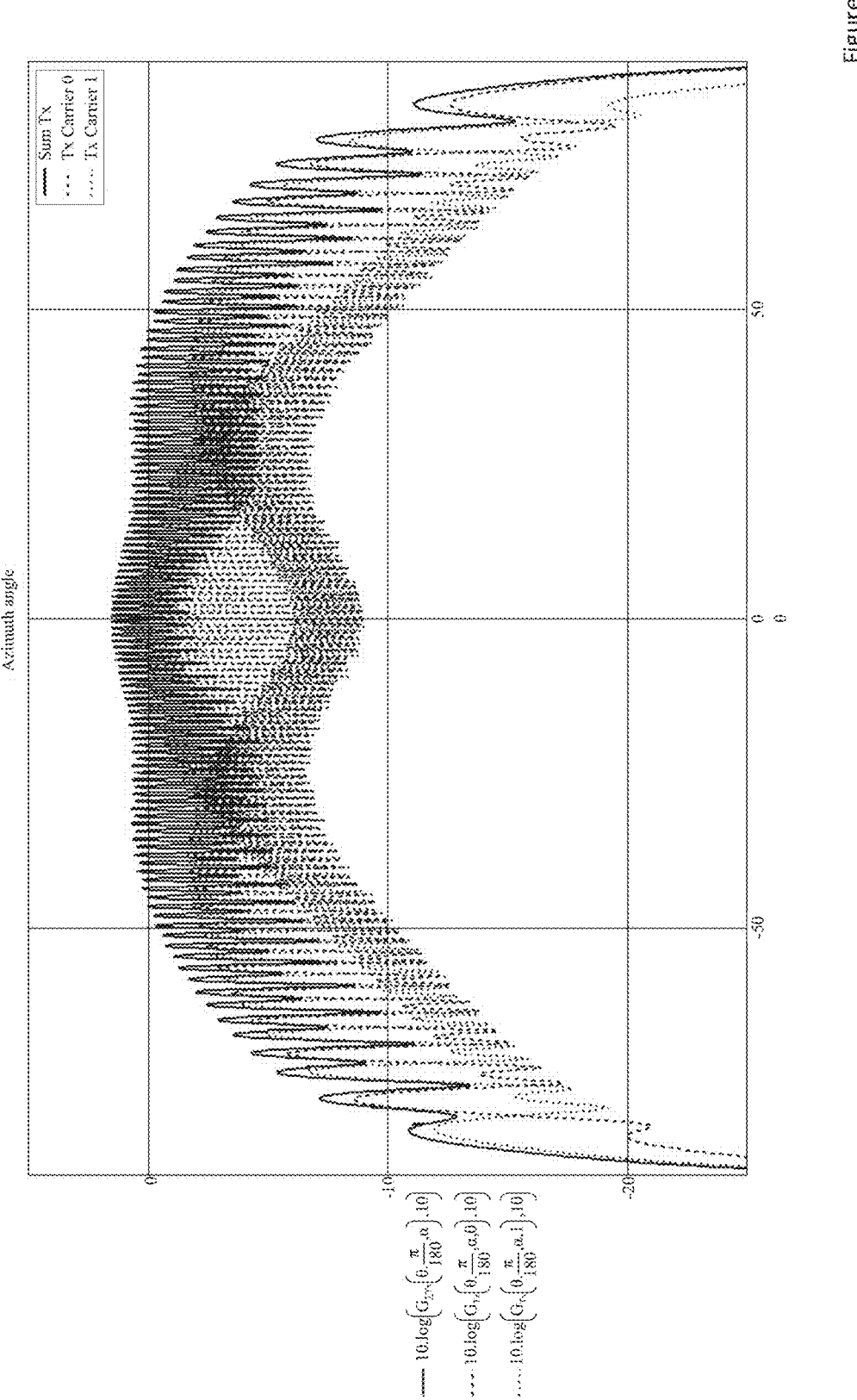
Figure 5:
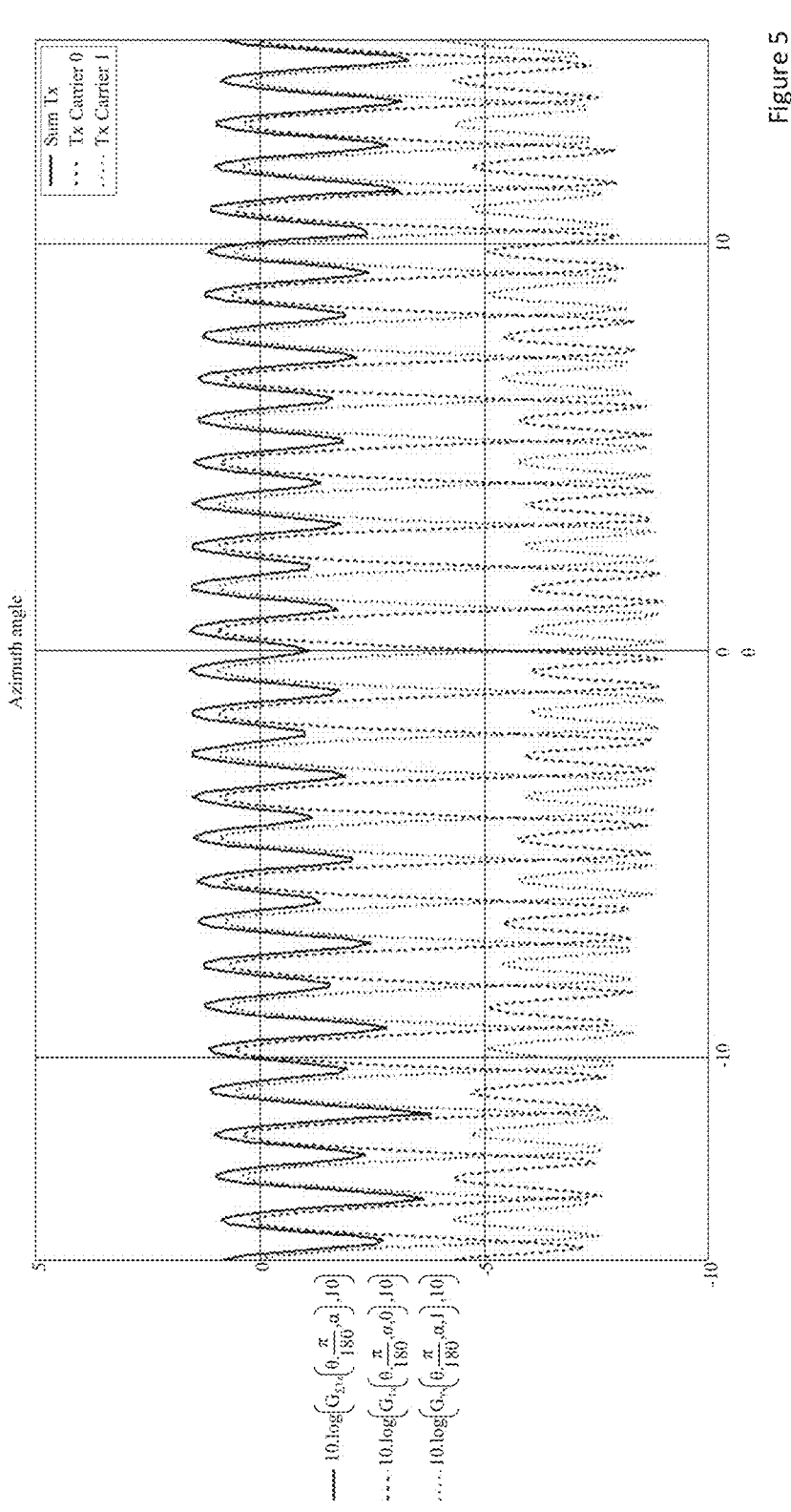
FIG. 5 Illustrates an expanded view of the boresight in the diagram in FIG. 4

FIG. 4 discloses a diagram illustrating separate carriers used in each of the two transmit arrays 3, 4 illustrated in FIGS. 1-3. Accordingly, FIG. 4 illustrates the total illumination (Sum Tx) of an area of interest and the individual illuminations of each transmit signal, each with a separate carrier (Tx Carrier 0, Tx Carrier 1). The carriers as illustrated in FIG. 4 have been used to achieve orthogonality between the signals transmitted. As mentioned previously in the present disclosure orthogonality may also be obtained by means of time division or coding of intrapulse modulation. FIG. 5 discloses an expanded view of the transmit illumination illustrated in FIG. 4, the expansion being around boresight, i.e. centre of the plot illustrated in FIG. 4.

Figure 6:
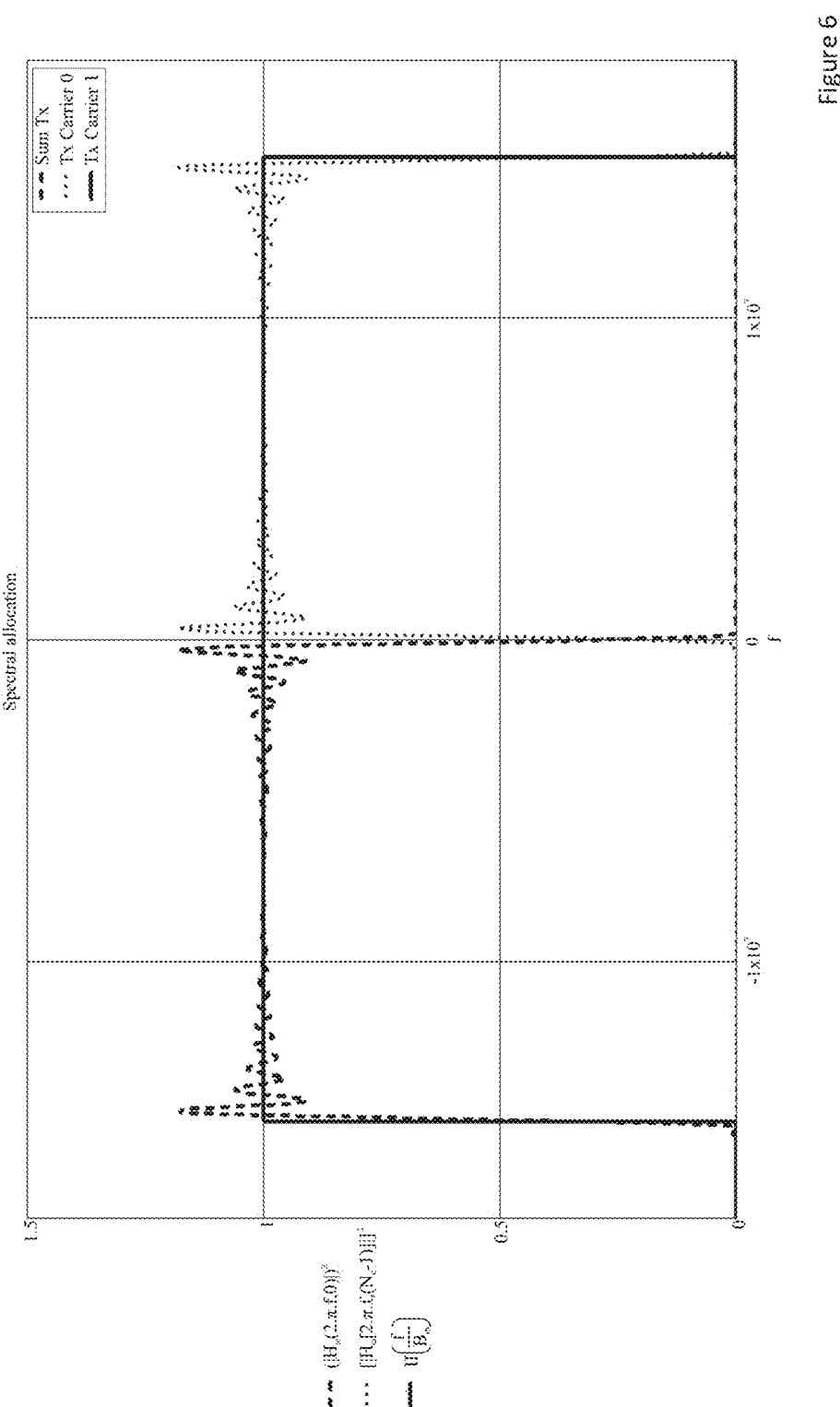
FIG. 6 Illustrates the spectral occupation of each of the transmit waveforms

FIG. 6 discloses the spectral occupation of each of the transmit waveforms (shown in FIGS. 3-4) in contrast to the receiver instantaneous bandwidth. The total instantaneous bandwidth is chosen to be equal to 30 MHz and both the bandwidth around each carrier as well as the carrier separation to 15 MHz.

Figure 7:
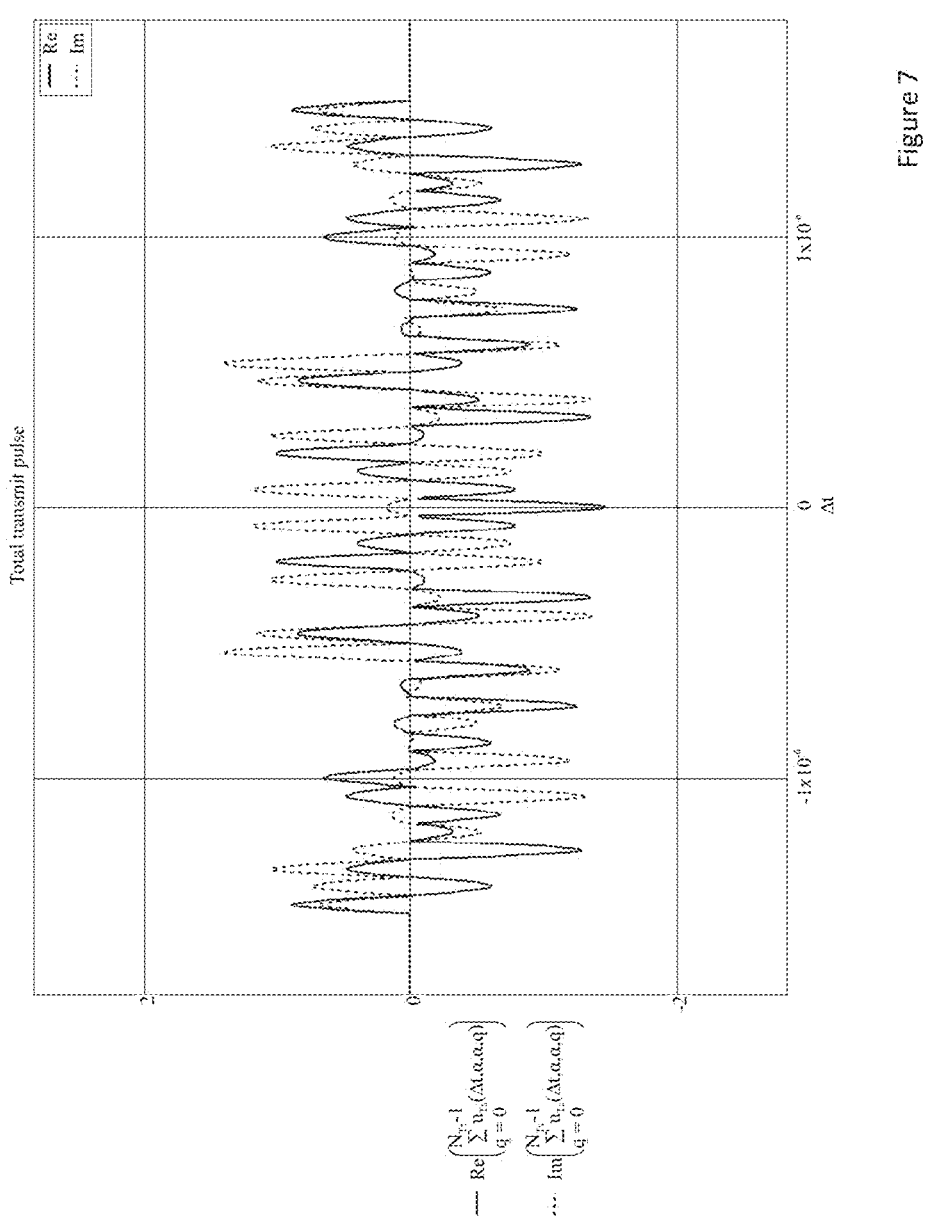
FIG. 7 Illustrates a boresight waveform
Figure 8:
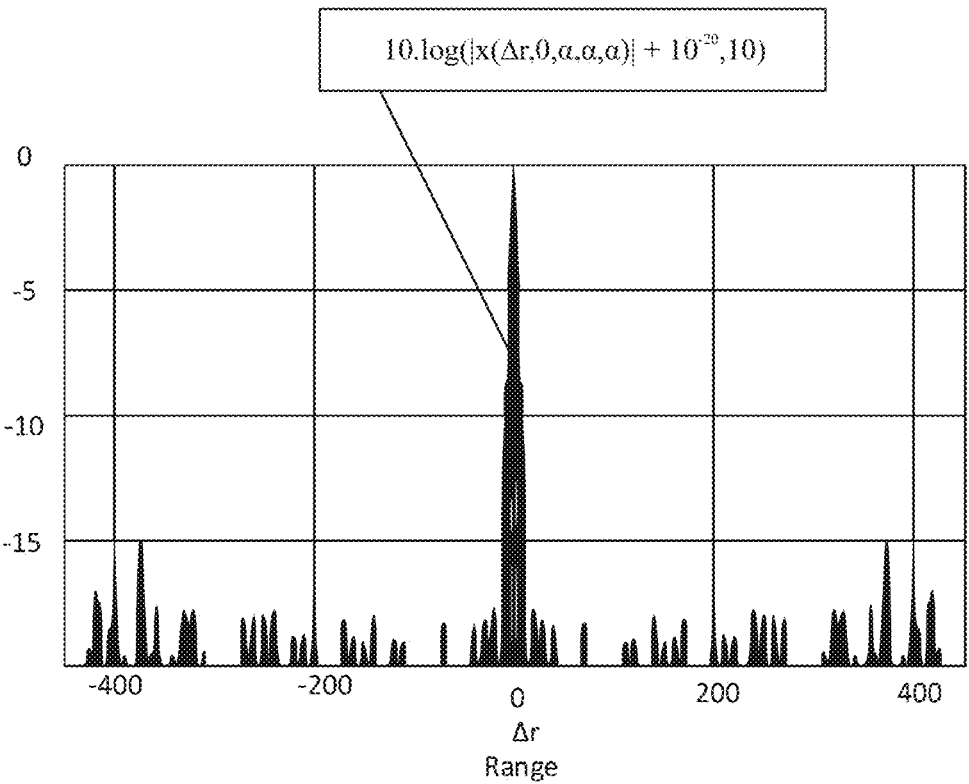
FIG. 8 Illustrates the boresight range side-lobe pattern

The spectral occupancy around each carrier may be created by a 45-bin polyphaser code as disclosed in Table 1. The code used for the second carrier may be a time-reversed copy of the code used for one of the carriers. It should however be observed that any suitable code could be used and the one found in Table 1 only serves as an illustrative example. Resulting boresight waveform is illustrated in FIG. 7. Thus, FIG. 7 illustrates the boresight expansion of FIG. 6 in the time domain. The boresight range side-lobe pattern is illustrated in FIG. 8.

TABLE 1

| Discloses intrapulse modulation for the first transmit carrier, a time reversed copy may be used for the second transmit carrier. | |
|---|---|
| Bin | Intrapulse phase code modulation |
| 1 | 1 + 0i |
| 2 | 1 + 0i |
| 3 | 0.875633171036337 + 0.482976759048351i |
| 4 | 0.995545524440679 + 0.09428207022661801i |
| 5 | 0.583541211356118 − 0.812083526891806i |
| 6 | 0.29320612662213 − 0.956049249417229i |
| 7 | 0.611527040185831 − 0.79122353296749i |
| 8 | −0.246829883811425 − 0.969058826107909i |
| 9 | −0.652363002903693 − 0.757906664730213i |
| 10 | 0.46345069976568 − 0.88612270532173i |
| 11 | 0.995107437258145 − 0.0987987262748253i |
| 12 | 0.736215213050721 + 0.676747486196057i |
| 13 | 0.731948578908616 + 0.6813598739533i |
| 14 | 0.425621362968619 + 0.904901351189584i |
| 15 | −0.330679112019251 + 0.943743251564831i |
| 16 | −0.743495079558906 − 0.66874140493295i |
| 17 | −0.202274547717617 − 0.979328855566726i |
| 18 | 0.850076583477583 + 0.526659094883094i |
| 19 | −0.779665947074937 + 0.626195665085396i |
| 20 | −0.884499561917946 + 0.466541021740813i |
| 21 | 0.993571855676587 − 0.113203213767907i |
| 22 | 0.361299105656754 − 0.932449975200616i |
| 23 | −0.995278357842712 + 0.0970617865584347i |
| 24 | 0.756310380251472 − 0.654212968935861i |
| 25 | −0.428619783775128 − 0.903484964433035i |
| 26 | −0.526659094883094 + 0.850076583477583i |
| 27 | 0.5984644366287 + 0.801149373145041i |
| 28 | 0.986314392756544 − 0.164875464036615i |
| 29 | −0.443696948395968 − 0.896176889896245i |
| 30 | −0.367799977044112 − 0.929904928950455i |
| 31 | −0.252407137103844 + 0.96762112272265i |
| 32 | 0.747682202125493 + 0.664056717927598i |
| 33 | −0.64399015981851 − 0.765033810048734i |
| 34 | 0.946141878672076 + 0.323752290220279i |
| 35 | −0.816440043736558 − 0.577430216548673i |
| 36 | 0.362112684089851 + 0.932134327241114i |
| 37 | 0.447134741355167 − 0.89446661372756i |
| 38 | −0.63202930266485 + 0.77494448870418i |
| 39 | 0.0895896429900148 − 0.995978762759991i |
| 40 | 0.6276913612907 + 0.778462301567023i |

TABLE 1-continued

| Discloses intrapulse modulation for the first transmit carrier, a time reversed copy may be used for the second transmit carrier. | |
| --- | --- |
| Bin | Intrapulse phase code modulation |
| 41 | −0.997158900260614 + 0.0753268055279326i |
| 42 | 0.767500908880312 − 0.641047856924813i |
| 43 | −0.272784025857237 + 0.960275296033069i |
| 44 | −0.136925897678074 − 0.990581293254145i |
| 45 | 0.18772418609735 + 0.9822217824677731i |

Figure 9:
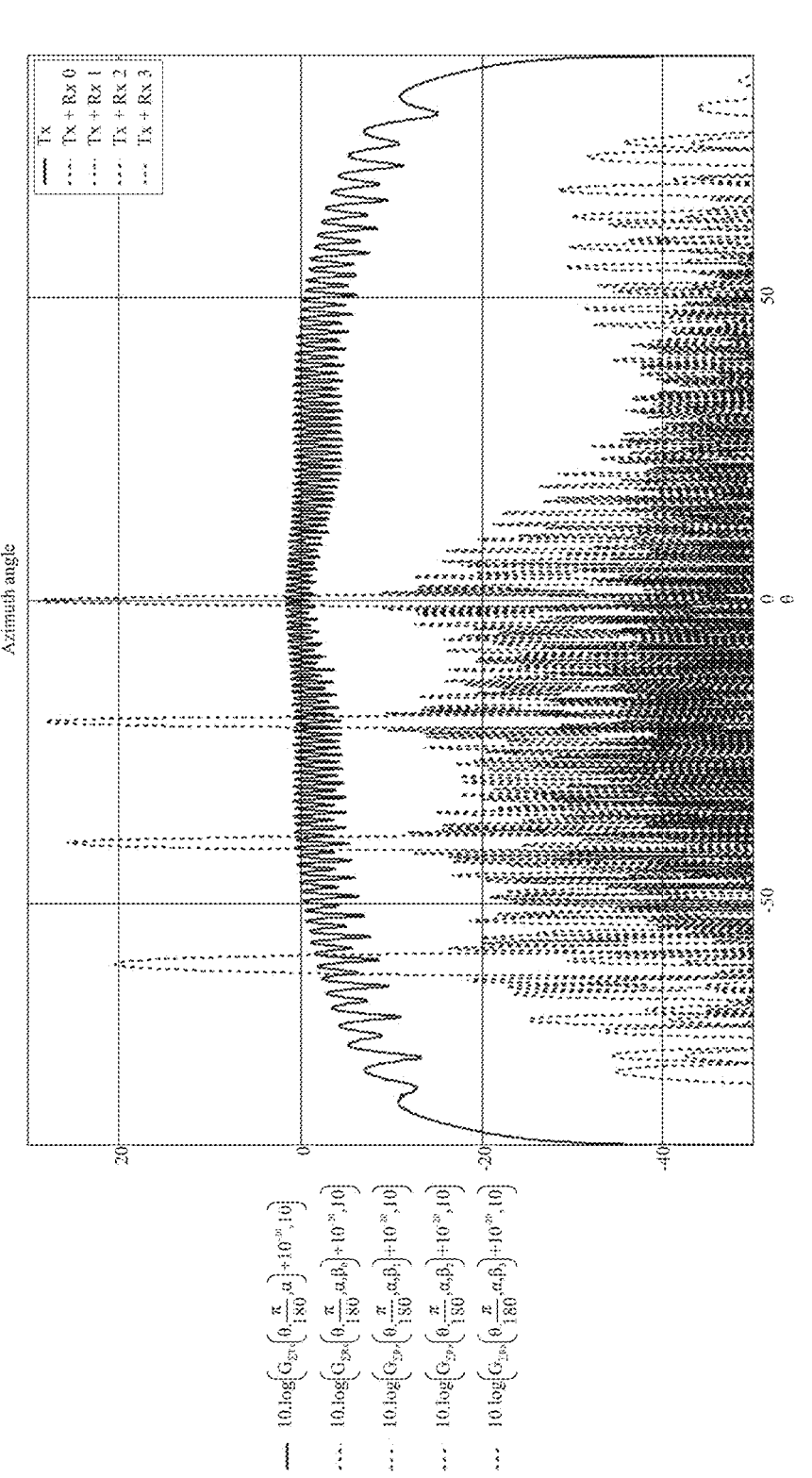
FIG. 9 Illustrates transmit illumination and two-way transmit receive patterns for four receive main beam directions FIG. 10 Illustrates a normalized expansion around each main beam in FIG. 9

FIG. 9 illustrates the resulting transmit illumination and two-way transmit receive patterns for four receive main beam directions, 0°, −20°, −40°, and −60°. Observe that an arbitrarily number of receive beams could be formed simultaneously, covering the total area of interest.

Figure 10:
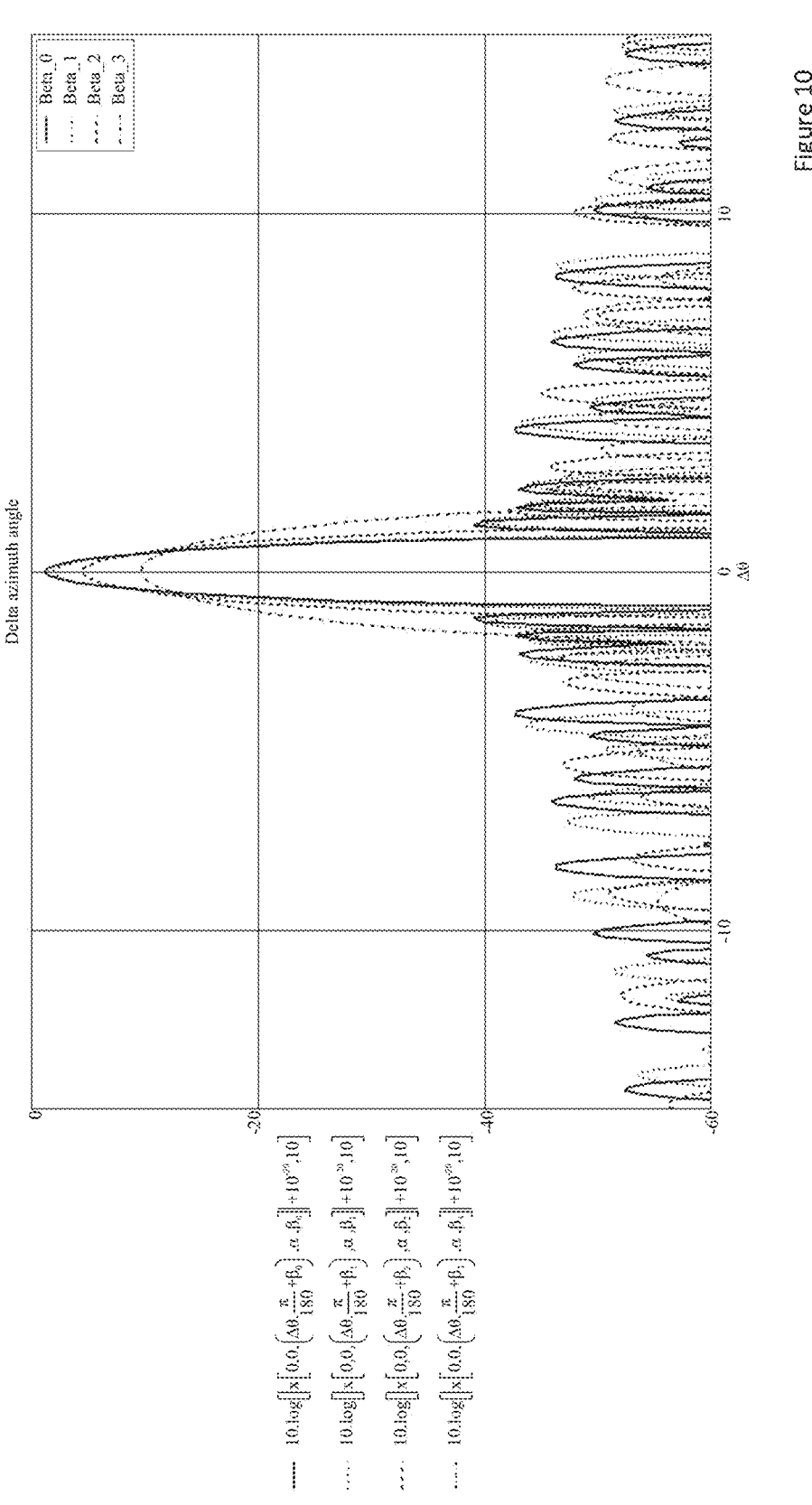

FIG. 10 illustrates the normalized expansion around each main beam illustrated in FIG. 9.

Table 2 discloses a comparison of five different transmit array configurations. The receive array is a 40 dB Taylor Receive Tapering array with 128 receive antenna elements and is used in all of the configurations.

TABLE 2

| Comparison between different transmit array configurations. | | | | | |
| --- | --- | --- | --- | --- | --- |
| Transmit array configuration | A N_Tx | B N_Rx | C BW_3 dB_2W | D BW_6 dB_2W | E 1st SLL_dB |
| 1 Full Tx array | 128 | 128 | 0.64° | 0.89° | −28.5 dB |
| 2 On central Tx elm. | 1 | 128 | 1.09° | 1.52° | −40.0 dB |
| 3 One Tx at each end | 2 | 128 | 0.41° | 0.55° | −6.5 dB |
| 4 6 Tx Amplitude Taper | 6 | 128 | 0.64° | 0.89° | −30.0 dB |
| 5 8 Tx Space Taper | 8 | 128 | 0.68° | 0.94° | −41.0 dB |

The first configuration uses a full transmit array with 128 antenna elements.

The second configuration uses a transmit array with a single central transmit antenna element.

The third configuration is a MIMO arrangement having two transmit arrays, each having one antenna element at one of the end portions (corresponding to the end portions as shown in FIG. 1) of the transmit array. In the third configuration, two separate carriers have been used for each transmit array as described in the example above.

The fourth configuration uses an amplitude tapering with 6 antenna elements, where the central antenna element of each transmit array has been merged to one element with a doubled output power as compared to the other antenna elements.

The fifth configuration is the transmit configuration as disclosed in the FIGS. 1-3, comprising a transmit array having two overlapping sparse transmit arrays 3,4 (see FIGS. 1-3).

The configuration in Table 2 discloses a 3 dB beam width (shown below the C column), 6 dB beam width (shown below the D column) and the level of the first side lobe (shown below the E column) for the five different configurations. It should be noted that the side-lobe levels refer to the first side-lobes on either side of the main beam.

Columns A and B in Table 2 shows the number of antenna elements in the transmit array (Column A) and the receive array (Column B), respectively. It should be noted that the transmit array as referred to in Table 2 may be a plurality of collocated transmit arrays (e.g. a first and a second transmit array having 8 antenna elements in total, such is disclosed in the fifth configuration (and FIGS. 1-3).

The second configuration shows a full side-lobe suppression (−40 dB), but the two-way beam is extremely wide due to the lack of transmit beam-shaping.

In the third configuration, which incorporates a MIMO system, extremely high side-lobe levels are obtained due to the narrow interference pattern caused by two transmit waveforms. This interference pattern has narrower beams than the receive pattern and almost three transmit interference beams are enclosed by the much wider receive main beam. This results in an extremely narrow two-way main beam at the cost of very high side-lobe level which is shown in Table 2.

In the fourth configuration which is also a MIMO system, some of the side-lobe suppression is regained at the expense of a wider two-way main beam.

However, in the fifth configuration, the embodiment as disclosed herein (see FIGS. 1-3), full side-lobe suppression is regained and the two-way main beam is only slightly wider than the full transmit array configuration in the first example. It is thus provided a system that combines full side-lobe suppression (−41 dB) and a narrow two-way main beam (0,68° (−3 dB) and 0,94° (−6 dB)).

It should be noted that the only configuration disclosing a "sufficient" side-lobe suppression for certain radar applications is the second configuration and the fifth configuration. However, the second configuration exhibits a wider beam as compared to the fifth configuration. In other words, the fifth configuration provide an improved angular resolution compared to the second configuration. As seen in Table 2, the fifth configuration is the only configuration of the 5 example configurations that may provide sufficient side-lobe suppression combined with a narrow beam width. Thus combining side-lobe suppression and angular resolution.

It should be pointed out that the fifth example described in Table 2 is in accordance with an embodiment of the present disclosure. The disclosure is based on the combination of MIMO and the radiation of overlapping interference patterns arranged in such a way that almost uniform illumination of the area of interest is obtained. Other configurations with more than two waveforms, where the orthogonality is created by carrier separation and/or code diversity (intrapulse modulation), two or more groups of transmit elements, combined with space and/or amplitude and/or phase tapering as disclosed herein may be utilized, further the number of antenna elements may be varied.

Figure 11:
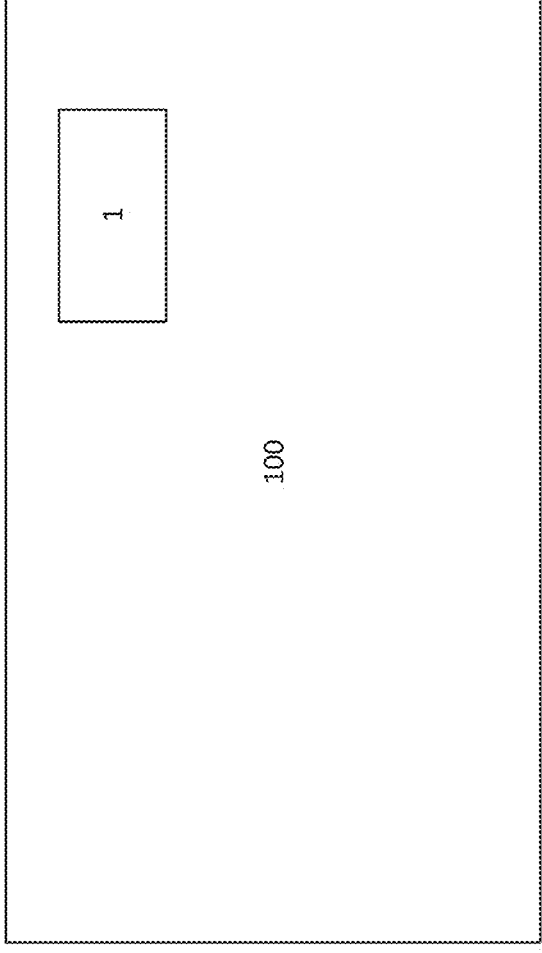
FIG. 11 schematically illustrates a fixed installation in accordance with an embodiment of the present disclosure FIG. 12 schematically illustrates a vehicle in accordance with an embodiment of the present disclosure

As shown in FIG. 11, there is also provided a fixed installation 100 comprising the system 1.

Figure 12:
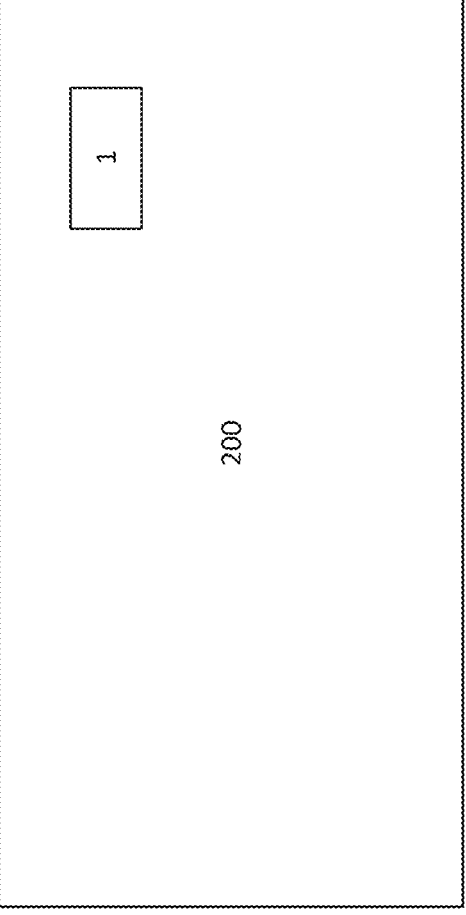

Further, as seen in FIG. 12, there is further provided a vehicle 200 comprising the system. The vehicle may be an airborne vehicle or a ground vehicle.

The invention claimed is:

1. A multiple-input multiple-output (MIMO) radar system comprising:

an antenna comprising two sparse transmit arrays, each sparse transmit array comprising a plurality of antenna elements;

wherein the antenna elements of each sparse transmit array are at least partially overlapping with the antenna elements of the other sparse transmit array of the two sparse transmit arrays such that one or more antenna elements of each sparse transmit array are arranged between two antenna elements of the another sparse transmit array of the two sparse transmit arrays; and a control circuitry connected to the antenna, the control circuitry is configured to:

transmit a signal having a waveform by means of each sparse transmit array, wherein the waveform of each signal is substantially orthogonal relative to a waveform of each other signal of the other sparse transmit array of the two sparse transmit arrays;

wherein the waveforms of each signal together form an interference pattern, and wherein a sum of all interference patterns of all of the signals illuminate an area of interest.

2. The radar system according to claim 1, wherein the antenna further comprises at least one receive array.

3. The radar system according to claim 2, wherein the control circuitry is further configured to control an excitation phase and amplitude of each antenna element of the at least one receive array such that all received main-beam widths are matched to corresponding separation between adjacent transmit interference peaks.

4. The radar system according to claim 3, wherein the at least one receive array is a uniform linear receive array.

5. The radar system according to claim 1, wherein each sparse transmit array is linearly arranged with a combined length equal to a length of the at least one receive array multiplied by an aperture efficiency of the at least one receive array.

6. The radar system according to claim 1, wherein each of the sparse transmit arrays comprise a central portion at an intermediate location between two end portions along at least a first linear row, and wherein the antenna elements of at least one sparse transmit array of the two sparse transmit arrays are arranged in a space tapered configuration having a higher density of a number of antenna elements in the central portion relative to the end portions.

7. The radar system according to claim 1, wherein each signal is associated with angular ambiguities, and wherein the control circuitry is further configured to;

control a phase-front of each waveform to distribute the angular ambiguities over the area of interest.

8. The radar system according to claim 1, wherein the orthogonality between the waveforms is obtained by at least one of carrier separation, time division, and coding of an intrapulse modulation.

9. The radar system according to claim 1, wherein at least two adjacent antenna elements of each sparse transmit array have a spacing between each other of at least half a wavelength of an operating frequency of the radar system.

10. The radar system according to claim 1, wherein the antenna elements of each sparse transmit arrays are at least partially overlapping with the antenna elements of the other sparse transmit arrays such that a first antenna element of a first sparse transmit array is adjacent to a first antenna element of a second sparse transmit array.

11. A fixed installation comprising a multiple-input multiple-output (MIMO) radar system, the MIMO radar system comprising:

an antenna comprising two sparse transmit arrays, each sparse transmit array comprising a plurality of antenna elements;

wherein the antenna elements of each sparse transmit array are at least partially overlapping with the antenna elements of the other sparse transmit array of the two sparse transmit arrays such that one or more antenna elements of each sparse transmit array are arranged between two antenna elements of the another sparse transmit array of the two sparse transmit arrays; and a control circuitry connected to the antenna, the control circuitry is configured to:

transmit a signal having a waveform by means of each sparse transmit array, wherein the waveform of each signal is substantially orthogonal relative to a waveform of each other signal of the other sparse transmit array of the two sparse transmit arrays, and wherein the waveforms of each signal together form an interference pattern, and wherein a sum of all interference patterns of all of the signals illuminate an area of interest.

12. A vehicle comprising a multiple-input multiple-output (MIMO) radar system, the MIMO radar system comprising:

an antenna comprising two sparse transmit arrays, each sparse transmit array comprising a plurality of antenna elements;

wherein the antenna elements of each sparse transmit array are at least partially overlapping with the antenna elements of the other sparse transmit array of the two sparse transmit arrays such that one or more antenna elements of each sparse transmit array are arranged between two antenna elements of the another sparse transmit array of the two sparse transmit arrays; and a control circuitry connected to the antenna, the control circuitry being configured to:

transmit a signal having a waveform by means of each sparse transmit array, wherein the waveform of each signal is substantially orthogonal relative to a waveform of each other signal of the other sparse transmit array of the two sparse transmit arrays;

wherein the waveforms of each signal together form an interference pattern, and wherein a sum of all interference patterns of all of the signals illuminate an area of interest.

* * * * *